(12) United States Patent
Cheung et al.

(10) Patent No.: US 10,825,181 B2
(45) Date of Patent: *Nov. 3, 2020

(54) IMAGE SEGMENTATION WITH TOUCH INTERACTION

(71) Applicant: Facebook, Inc., Menlo Park, CA (US)

(72) Inventors: Vincent Charles Cheung, San Carlos, CA (US); Connie Yeewei Ho, San Jose, CA (US); Balmanohar Paluri, Newark, CA (US)

(73) Assignee: Facebook, Inc., Menlo Park, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/369,750

(22) Filed: Mar. 29, 2019

(65) Prior Publication Data

US 2019/0272642 A1 Sep. 5, 2019

Related U.S. Application Data

(63) Continuation of application No. 15/395,512, filed on Dec. 30, 2016, now Pat. No. 10,249,044.

(51) Int. Cl.
*G06T 7/11* (2017.01)
*G06F 3/16* (2006.01)
*G06K 9/00* (2006.01)
*G06K 9/32* (2006.01)
*G06F 3/0481* (2013.01)
(Continued)

(52) U.S. Cl.
CPC ............ *G06T 7/11* (2017.01); *G06F 3/04815* (2013.01); *G06F 3/04845* (2013.01); *G06F 3/167* (2013.01); *G06K 9/00671* (2013.01); *G06K 9/3233* (2013.01); *G06F 3/017* (2013.01); *G06F 3/04842* (2013.01); *G06T 2200/24* (2013.01); *G06T 2207/10004* (2013.01)

(58) Field of Classification Search
CPC .................. G06T 7/11; G06T 2200/24; G06T 2207/10004; G06F 3/04815; G06F 3/04845; G06F 3/167; G06F 3/017; G06F 3/04842; G06K 9/00671; G06K 9/3233
See application file for complete search history.

(56) References Cited

U.S. PATENT DOCUMENTS 8,791,941 B2 * 7/2014 Birtwistle ............. G06T 11/001 345/418
9,542,626 B2 * 1/2017 Martinson .......... G06K 9/00369
(Continued)

*Primary Examiner* — Qian Yang
(74) *Attorney, Agent, or Firm* — Baker Botts L.L.P.

(57) ABSTRACT

In one embodiment, a method includes detecting one or more objects in an image, generating at least one mask for each of the detected objects, wherein each of the masks is defined by a perimeter, classifying the detected objects, receiving gesture input in relation to the image, determining whether one or more locations associated with the gesture input correlate with any of the masks, and providing feedback regarding the image in response to the gesture input. Each of the masks may include data identifying the corresponding detected object, and the perimeter of each mask may correspond to a perimeter of the corresponding detected object. The perimeter of the corresponding detected object may separate the detected object from one or more portions of the image that are distinct from the detected object.

20 Claims, 8 Drawing Sheets

(51) Int. Cl.
*G06F 3/0484* (2013.01)
*G06F 3/01* (2006.01)

(56) References Cited

U.S. PATENT DOCUMENTS

| | | | |
|---|---|---|---|
| 2004/0114829 A1* | 6/2004 | LeFeuvre | G06T 5/005 |
| | | | 382/275 |
| 2014/0168124 A1* | 6/2014 | Park | G06F 3/0416 |
| | | | 345/173 |
| 2014/0282240 A1* | 9/2014 | Flynn, III | G06F 9/451 |
| | | | 715/810 |
| 2014/0351717 A1* | 11/2014 | Pryor | G06F 3/0482 |
| | | | 715/753 |
| 2016/0034784 A1* | 2/2016 | Ohmura | G06K 9/6254 |
| | | | 382/103 |
| 2017/0323449 A1* | 11/2017 | Aonuma | G06T 19/006 |

* cited by examiner

IMAGE SEGMENTATION WITH TOUCH INTERACTION

PRIORITY

This application is a continuation under 35 U.S.C. § 120 of U.S. patent application Ser. No. 15/395,512, filed 30 Dec. 2016.

TECHNICAL FIELD

This disclosure generally relates to recognition of and interaction with objects in digital images or videos.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a system may use image segmentation and classification techniques to automatically identify and classify objects displayed in images, and use the resulting information about the displayed objects and their types to interact with users in ways that may have previously been difficult or impractical to implement. An object may be any suitable identifiable item in an image (e.g., a person, an animal, an arm, a table, a cup, etc.). For example, the information about the objects may be used to describe the content of photos to blind users. An audio description such as "photo contains a girl, a man in a hat, and a table" may be played or spoken by a text-to-speech system. The techniques disclosed herein can, for example, provide immersive experiences that allow users to perceive the objects in a photo by swiping their finger across an image on a touch screen display and having the system describe the objects that are touched.

In particular embodiments, a user of a virtual reality environment may request that an image be made of a portion of the user's view, and a mask be generated based on the image. The mask may be generated using image segmentation techniques. The user may then apply the mask to a 3D object in the virtual reality environment. When the mask is applied to a 3D object, the object depicted in the image that corresponds to the mask is incorporated into the 3D object to form a virtual object. The incorporated image or portion thereof may then appear in association with, e.g., as if attached to or rendered onto a surface of, the 3D object in the virtual reality environment, thus forming a new virtual object. For example, the incorporated image may be represented as a photograph attached to the 3D object at a location on the 3D object designated by the user. As another example, the incorporated image may be represented as if it is painted onto the 3D object at a location designated by the user. That is, the mask may be used like a sticker that depicts the incorporated image, and can be affixed to the 3D object while molding its shape to conform to the shape of the 3D object as appropriate.

DESCRIPTION OF EXAMPLE EMBODIMENTS

Figure 1:
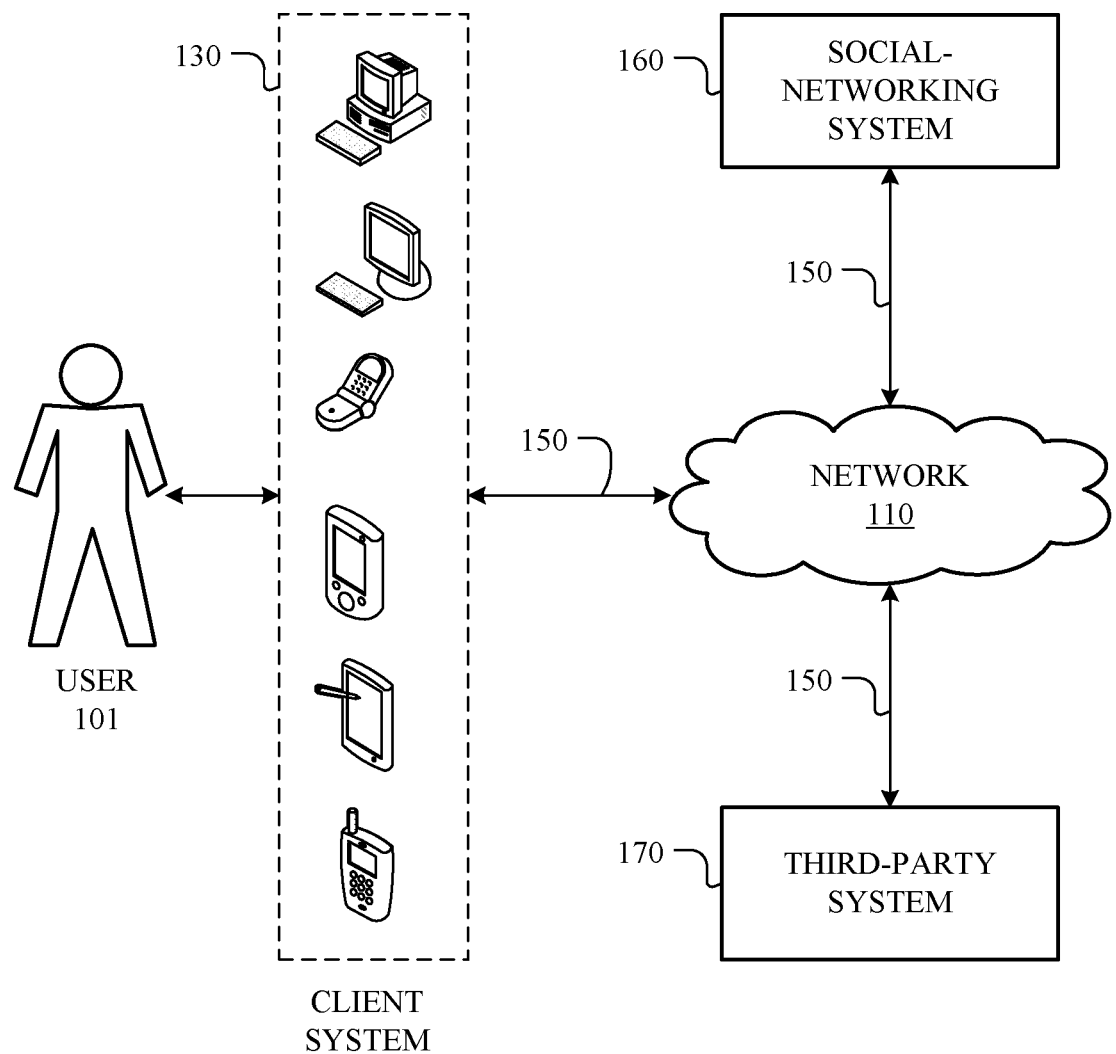
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. Client system 130 may be any suitable computing device, such as, for example, a personal computer, a laptop computer, a cellular telephone, a smartphone, a tablet computer, or an augmented/virtual reality device.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
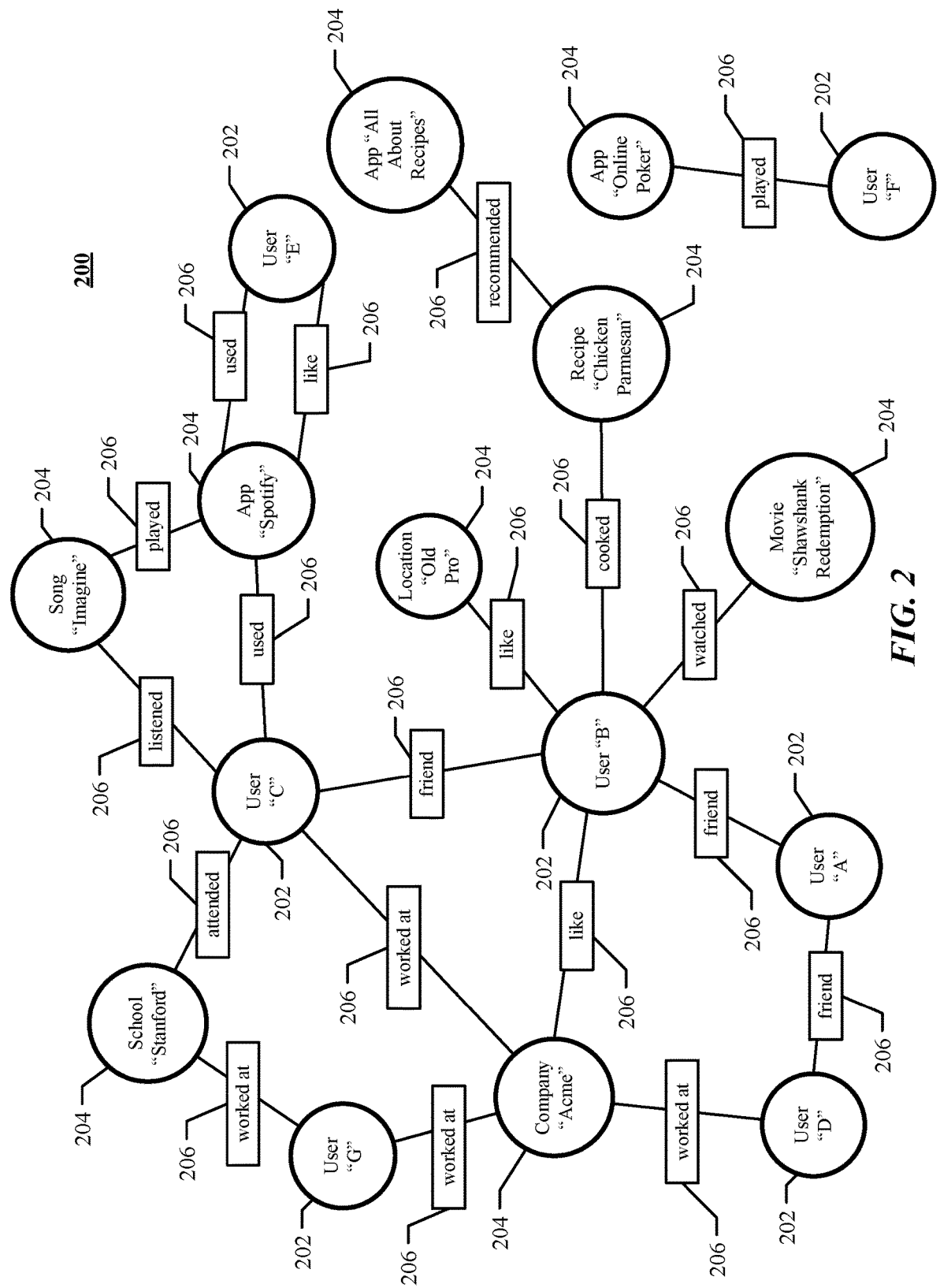
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. As an example and not by way of limitation, an advertisement may display information about a friend of the user within social-networking system 160 who has taken an action associated with the subject matter of the advertisement.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In particular embodiments, a system may display an image on a client system 130, then automatically identify objects in the image and provide feedback, such as written or spoken audio descriptions of the objects, in response to user gestures. The gestures may be associated with an image, e.g., gestures that cause the image to be displayed, in which case descriptions of the objects in the image may be provided to the user. The gestures may also touch, point to, or otherwise indicate specific portions of the image, in which case the system may identify specific objects displayed in the image at the locations indicated by the gestures. Descriptions of the identified objects may then be provided to the user. An object may be any suitable identifiable item in an image (e.g., a person, an animal, an arm, a leg, a cup, etc.). Objects of many types can be identified accurately by a human viewing the image. For example, FIG. 3 illustrates several objects in an image, including a person, two animals sitting at a table, and several tea cups and a tea pot on the table.

An automated system may thus identify and classify the objects in images, and use the resulting information to interact with users in ways that may have previously been difficult or impractical to implement. For example, the information may be used to describe the content of photos to blind users. An audio description such as "photo contains a girl, a hare, a mouse, a man in a hat, and a table" may be played or spoken by a text-to-speech system. The techniques disclosed herein can provide immersive experiences that allow users to perceive the objects in a photo by swiping their finger across an image on a touch screen display and having the system describe the content they are touching.

Figure 3:
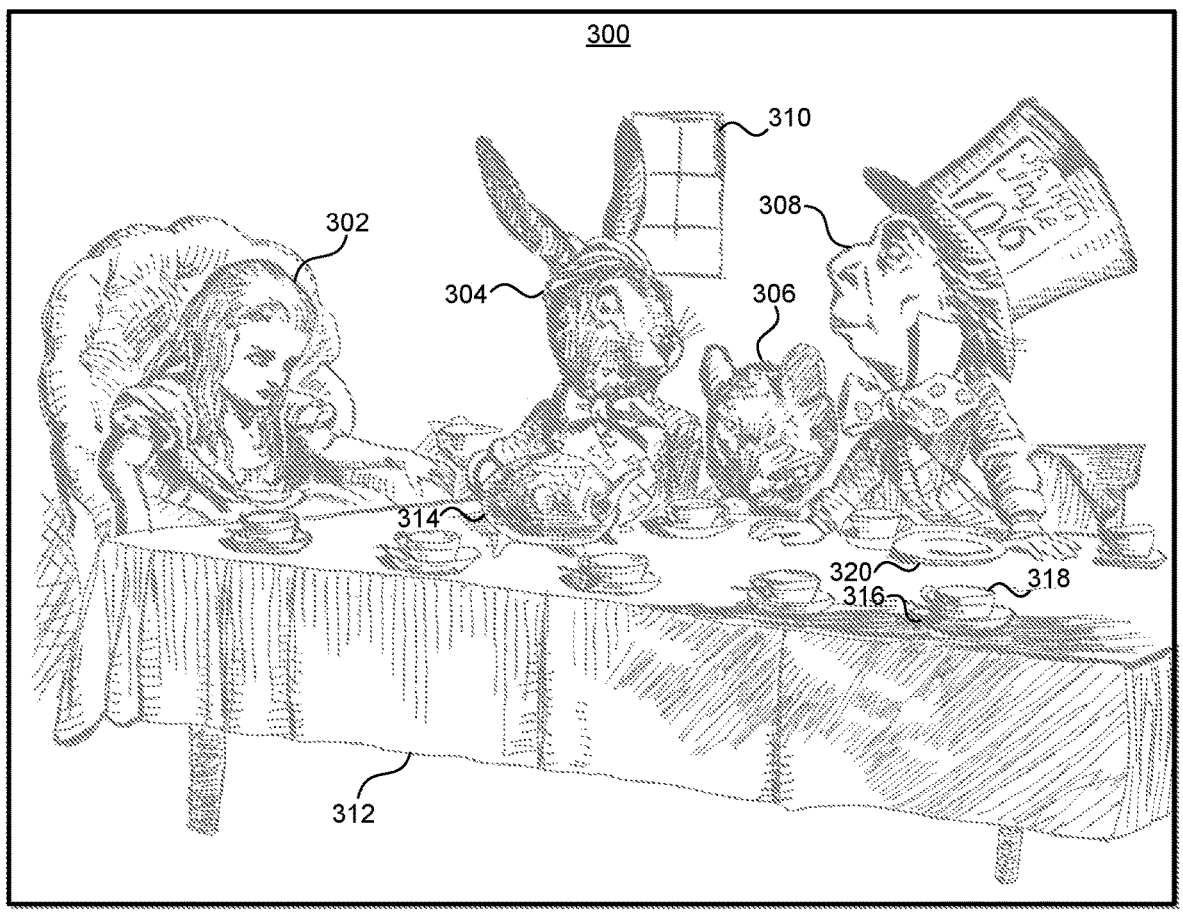
FIG. 3 illustrates example objects in an image.

FIG. 3 illustrates example objects 302-320 in an image 300. In particular embodiments, objects in an image may be identified and classified by algorithms using machine learning techniques. Objects 302-320 may be identified using image segmentation techniques such as DeepMask and SharpMask, and classified using image classification techniques such as MuiltiPathNet. Image Segmentation methods are disclosed in U.S. Patent Application 62/351,851, filed 17 Jun. 2016, which is incorporated herein by reference. Although specific techniques are described for image identification and classification, other techniques may be used to identify image segments that correspond to objects and classify the objects. Information identifying an object may include the location of the object in the image and the perimeter of the object, e.g., coordinates of the object and of the pixels that form the perimeter of the object. An object may have an associated object type, which may correspond to a classification determined by an image classification technique. The object type may be a classification such as person or human for an Alice object 302 and a Mad Hatter object 308, hare for a March Hare object 304, mouse for a Dormouse object 306, window for a window object 310, hat for a Mad Hatter's hat, table for a table 312, tea pot for a tea pot 314, tea cup a the tea cup 318, and saucer for saucers 316, 320. The information identifying an object may also include an object name that identifies a specific instance of the object type, e.g., "Alice" may be identified as the name of the Alice object 302, and "March Hare" may be identified as the name of the March Hare 304.

Figure 4:
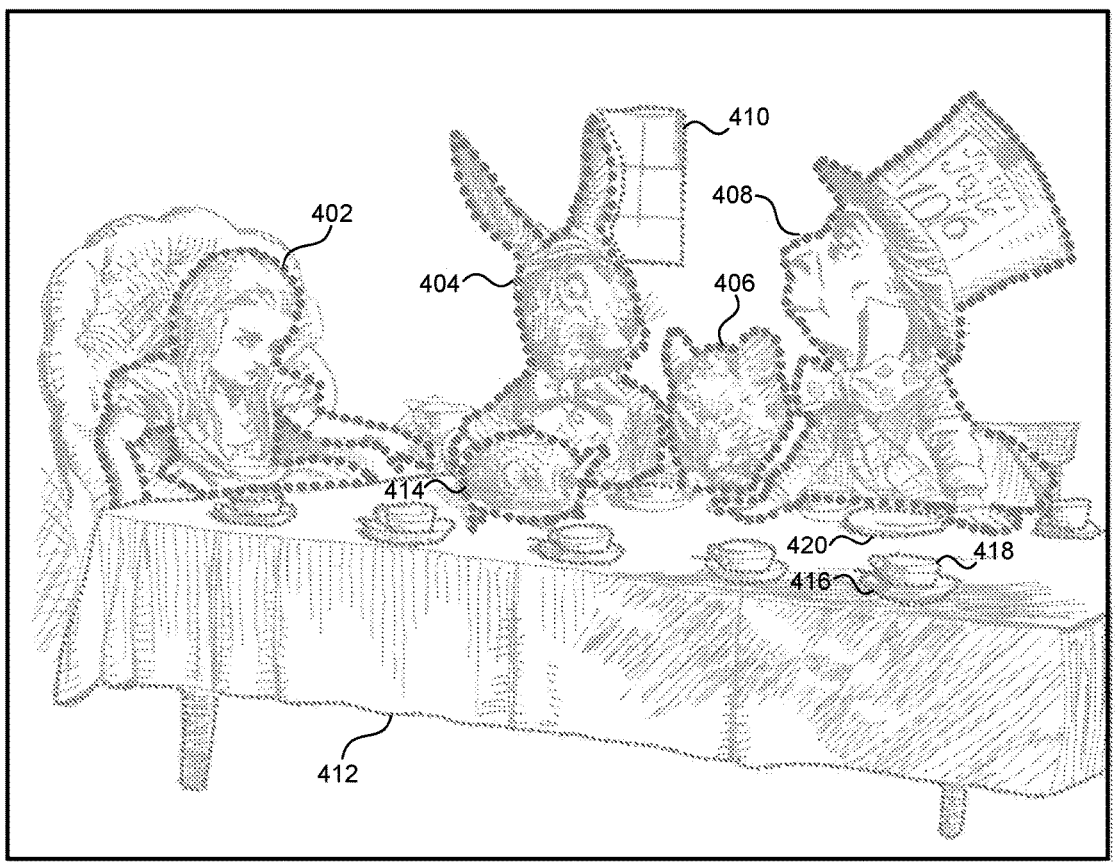
FIG. 4 illustrates example perimeters of masks for objects in an image.
Figure 5:
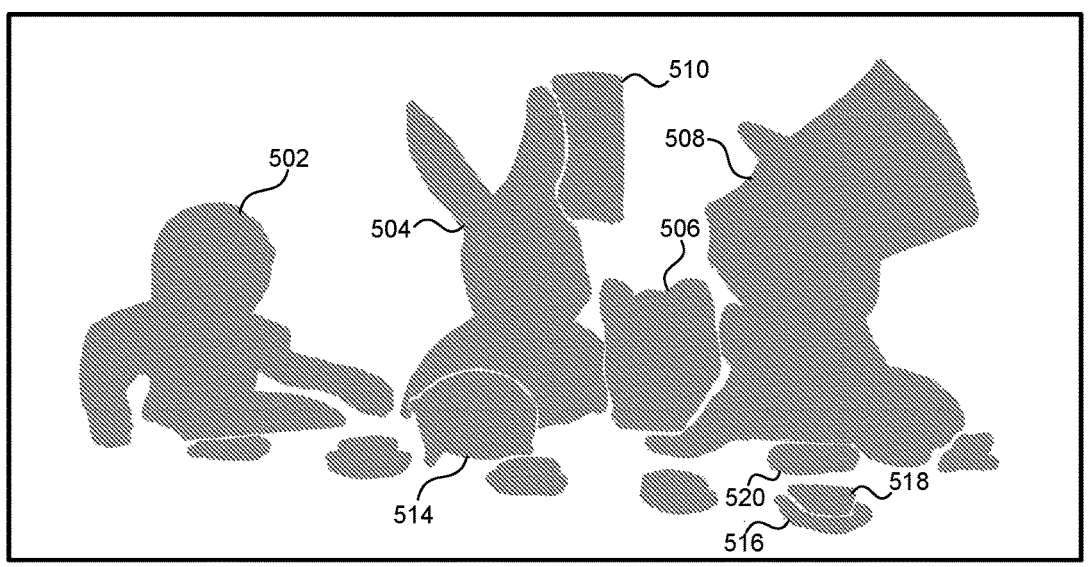
FIG. 5 illustrates example masks for objects in an image.

FIG. 4 illustrates example perimeters 402-420 of objects in an image, and FIG. 5 illustrates masks 502-520 for the objects in the image. The identification and classification of objects may involve image recognition. For example, a mask 502 may be identified that corresponds to an Alice object 302 in the image 300, and may be classified as a person via image recognition. Masks 502-520 correspond to the respective objects 302-320 and are bounded by the respective perimeters 402-420. For example, the perimeters shown in FIG. 4 include an Alice perimeter 402 for the Alice object 302, a Mad Hatter perimeter 408 for the Mad Hatter object 308, a March Hare perimeter 404 for the March Hare object 304, a Dormouse perimeter 406 for the Dormouse object 306, a window perimeter 410 for the window object 310, a table perimeter 412 for the table object 312, tea pot perimeter 414 for the tea pot object 314, a tea cup perimeter 418 for the tea cup object 318, and saucer perimeters 416, 420 for the saucer objects 316, 320.

In particular embodiments, mask 502 may be defined by a perimeter 402 of an object 302, and ordinarily includes a data structure representing the positions of the pixels in the mask 502, which may be based on the positions of corresponding pixels in the object 302. As can be seen in the example of FIG. 5, the shapes of the masks 502-520 correspond to the shapes of the object perimeters 402-420, which in turn correspond to the shapes of the objects 302-320. For example, the masks shown in FIG. 5 include an Alice mask 502 for the Alice object 302, a Mad Hatter mask 508 for the Mad Hatter object 308, a March Hare mask 504 for the March Hare object 304, a Dormouse mask 506 for the Dormouse object 306, a window mask 510 for the window object 310, a tea pot mask 514 for the tea pot object 314, a tea cup mask 518 for the tea cup object 318, and saucer masks 516, 520 for the saucer objects 316, 320.

Objects may overlap other objects, e.g., the tea pot 314 overlaps the hare 304 and the table 312, and the hare 304 overlaps the window 310. The image segmentation algorithm may identify an object that overlaps another object and generate the perimeters 402-420 (and masks 502-420) accordingly. In one example, any pixel within the tea pot perimeter 414 corresponds to the tea pot 314, any pixel within the March Hare perimeter 404 correspond to the March Hare 304, and the pixels within the tea pot perimeter 414 do not correspond to the March Hare 304 (even though the tea pot 314 occupies a region that would otherwise contain part of the March Hare 304 if the tea pot 314 were not present), because the tea pot 314 overlaps the March Hare 304. Similarly, the pixels within the window perimeter 410 correspond to the window 310, except for the pixels in the portion of the window 310 overlapped by the March Hare 304, which correspond to the March Hare 304. The boundaries between the overlapping objects 314, 304, and 310 are shown as white space between the masks 514, 504, and 510 in FIG. 5 for illustrative purposes. In one embodiment, the boundaries between overlapping objects are not empty regions, but instead correspond to the locations at which pixels from one object meet pixels from another object. Thus, a user 101 may slide a finger from the March Hare 304 to the tea pot 314, and when the finger first touches a pixel in the tea pot 314, which corresponds to a pixel in the mask 514, the tea pot 314 becomes the object designated by the finger. The gap between adjacent masks in FIG. 5 is shown for illustrative purposes. Pixels of the March Hare mask 504 may be adjacent to pixels of the tea pot mask 514 in the region shown as a gap between the two masks.

In particular embodiments, there may be a boundary between overlapping objects 304, 314, which may be displayed as part of the image 300 and/or represented as data associated with the adjacent masks 504, 514. The boundary may be displayed to assist the user 101 in distinguishing between overlapping objects, for example. In one example, the boundary may be shown by displaying the perimeters around the objects, such as the March Hare perimeter 404 and the tea pot perimeter 414. The perimeters may be displayed as shown in FIG. 4, e.g., as dashed or dotted lines of any appropriate width or color, or as solid lines of any appropriate width or color. In another example, only the portions of the perimeters that are between the overlapping objects, e.g., the portions of a perimeter that overlap a perimeter of another mask, may be shown, to indicate the boundaries between overlapping objects. In this example, the portion of the tea pot perimeter 414, which may overlap the March Hare perimeter 404, may be displayed as a boundary between the tea pot 314 and the March Hare 304. Some masks may be non-classified, e.g., object recognition may fail to recognize an object, or may have a low certainty about an identified object.

Image segmentation or classification may identify object types, and may also identify relationships or properties of objects. As an example, classification may determine that one object is behind another object, or that an object is red. Relationships between objects may be identified based on other objects in an image. For example, in an image depicting a bus and a person, the relative positions of the bus and person may be determined based on a known size ratio between people and buses. In this example, the bus being relatively small in the image and the person relatively large in the image compared to the known ratio may indicate that the bus is farther away than the person, so the bus is behind the person. If, e.g., an object 304 is identified as being behind or in front of another object 314, then this relationship may be included as part of the description of either or both of the objects. For example, when a user 101 selects an object 304 that is behind another object 314, the description may include a displayed or spoken indication that the object is behind the other object. If a user 101 selects the March Hare 305, e.g., by swiping on or pointing to it, then the description "A rabbit behind a tea pot", "The Match Hare behind a tea pot," or "The March Hare, which is a rabbit, behind a tea pot, which is on a table" may be displayed or spoken to the user.

When two or more of the objects 304, 314 in an image 300 overlap, the corresponding masks 504, 514 may be non-overlapping, with boundaries between the masks 504, 514 at the boundaries between overlapping objects 304, 314. Alternatively, the masks 504, 514 may overlap, in which case the mask 514 corresponding to the object 314 closest to the front (e.g., the front-most mask) may be selected when the user 101 selects a pixel that is on each of the overlapping masks (e.g., a pixel in the region of the image in which the objects 304, 314 intersect). In particular embodiments, both an overlapping object, such as the tea pot 314, and an overlapped object, such as the March Hare 304, may be identified as occupying the same region, which is ordinarily an intersection of the regions occupied by the two objects 304, 314 in the image 300. For example, the image segmentation algorithm may determine that the March Hare 304 occupies a portion of the region behind the tea pot 314, which is the region above the upper line of the table occupied by the upper half of the tea pot 314. The image segmentation algorithm or other component of the system may then determine that there is a portion of the March Hare 304 behind a portion of the tea pot 314 (e.g., behind approximately the top half of the tea pot 314). As a user 101 swipes over the tea pot 314, the audio may play "tea pot in front of a hare." As the user 101 swipes over the March Hare 304, the audio may play "March Hare behind a tea pot and in front of a window." The positions of the overlapping masks 504, 510 relative to each other may also be included in the description. For example, since the window 310 is near the upper portion of the March Hare 304, the audio may play "upper portion of hare in front of a window." If the image segmentation algorithm identifies the hare's ears as objects, then the audio may play "window behind hare's right ear" when the user 101 swipes over the window 310. If the image segmentation identifies the hare's head as well, then the audio may play "window behind hare's right ear and head" or "hare's right ear and head in front of window" when the user 101 swipes over the window 310 or hare 404, respectively.

In the tea cups on a table example, the masks for the tea cups and the table may overlap. The image segmentation algorithm may determine that a portion of the saucer 316 is behind the tea cup 318, and the table 312 is behind both the saucer 316 and the tea cup 318. Thus a particular region of the image 300 may correspond to multiple overlapping masks 516, 518 or to a subset of the multiple overlapping masks. As a user 101 swipes over the tea cups 318, the audio may indicate "tea cup on a table." Alternatively, the audio may identify the smaller mask, by indicating, for example, only "tea cup." A user 101 may also cycle through overlapping masks 516, 518 with a gesture. Using the example above, if the user 101 taps on the mask 518 that corresponds to the tea cup 318, audio may play "tea cup" and if the user 101 taps a second time, audio may play "table."

In particular embodiments, social-networking data may be used to help identify objects. For example, if a user 101 has a particular cat (e.g. "Fluffy"), depicted in multiple images, the cat may be identified as the particular cat. As another example, the context of the picture may aid in identifying objects. For example, geo-location data indicating that an image was taken at Fort Point in San Francisco may make it more likely that an object is the Golden Gate Bridge. As another example, photo albums may contain similar images, so that if an object is identified in an image in an album, a given object in another image of the album is more likely to be the same object.

A mask 502 may be represented as a matrix of values that correspond to pixels of the image 300 and indicate whether the corresponding pixel is in the corresponding object 302 (e.g., value=1 or true) or not in the object 302 (e.g., value=0 or false). The position of each value in the matrix corresponds to the position of a pixel in the object 302. The mask 502 thus specifies the shape of the object 302, and includes a specification (which may be implicit or explicit) of the perimeter 402 of each object. The perimeter 402 may be specified by the locations of adjacent 0 and 1 values in the mask matrix. The mask 502 ordinarily corresponds to a portion of the image 300 having dimensions in pixels that are sufficiently large to include the object 302. The location in the image 300 to which the mask corresponds, e.g., the coordinates of the top left corner of the mask 502 in the image 300, may be included in or associated with the mask 502. Although the mask 502 is described herein as having a particular value (e.g., 1 or true) for each entry that corresponds to a pixel in the object 302, other representations may be used, such as a mask 502 in which only the entries that form a 1-pixel-wide perimeter 402 around the object 302 are set to a value (e.g., 1 or true) indicating that they correspond to the object 302. Although the perimeter 402 is described as being represented by the mask 502, other representations are possible, e.g., a set of curves or vectors that can be mapped to pixels to identify a perimeter 402 at the pixel level in an image 300. Further, although the mask 502 is described as being represented by a matrix, other representations are possible, e.g., a list of (x,y) coordinates that are included in the object, a list of points that can be interpolated, one or more curves or vectors that can be mapped to pixels, and so on.

In particular embodiments, the perimeter 402 that corresponds to a mask 502 may be the same as a perimeter that a human viewing the image 300 would identify for the object 302, as may occur when there is strong contrast between the object 302 and its surroundings in the image 300, e.g., a dark object 302 against a light background of a different color. However, the perimeter 402 of an object 302 may be ambiguous or difficult to identify precisely, e.g., when the boundaries between the object 302 and its surrounds are amorphous. Thus the perimeter 402 that corresponds to the mask 502 may differ from the perimeter a human would identify, but ordinarily such differences are small (e.g., variations of several pixels in distance), and a human would agree that the perimeter 402 specified by the mask 502 is a reasonable for the object 302. Further, a mask need not be contiguous (e.g., an object may have multiple noncontiguous parts, or may be partially occluded by another object).

In particular embodiments, a mask 502 may have a touch area that differs from the area of the mask 502. For example, a mask such as the teacup mask 518 may be relatively small, and the touch area of the mask 518 may be increased to a size greater than the size of the mask 518. Increasing the touch area in this way may, for example, help a user 101 by providing larger touch areas for small masks. However, the increased touch area of the mask 518 should not overlap other masks, such as the mask 516 for the saucer 316 that is adjacent to the mask 518.

In particular embodiments, an object in an image may contain other smaller objects. That is, at least a portion of the object and at least a portion of each of the smaller objects may be visible, with the smaller objects overlapping the larger objects. The smaller objects may in turn contain still smaller objects, and so on. An object that is contained in another object is referred to herein as a nested object and may be identified and classified as described above. Thus an object that contains nested objects may have a mask that corresponds to the shape of the object in the image 300. Nested objects located within the object may also be associated with masks that correspond to the shapes of the nested object. The image segmentation algorithm may generate a list of objects nested within an object, and associate the list with the object, so that interactions with the user 101 can provide the list of objects to the user. For example, when a user 101 points to or swipes on an object that contains nested objects, the system may provide a description, e.g., by displaying text, generating braille script, or playing audio, stating that the object contains other objects, along with the types (or names) of the other objects. As another example, if the user 101 points to or touches one of the nested objects, the system may provide a description including the type or name of the nested object, and optionally, of the object within which it is nested. In another example, the system may provide descriptions of all the objects nested within an object, and the descriptions of the objects may be separated by prompts for a command to continue or stop describing the objects in the list. A size threshold may be associated with each nested object, so that if an object contains one or more objects that are smaller than the size threshold (e.g., have an area smaller than the size threshold), then the system may provide descriptions of the nested objects as well as the containing object as described above when the user 101 swipes, points to, or touches the containing object. As a further example, for each nested object that is larger than the size threshold, the system may provide a description for a nested object only when the nested object itself is selected (e.g., by swiping, pointing, touching, or making another gesture that designates the nested object's mask).

In particular embodiments, as introduced above, the system may provide feedback in response to user gestures. The gestures may be received by an input device via a I/O interface 908 of a client system 130, e.g., a touch screen, trackpad, mouse or other pointing device, virtual reality glove, eye tracking device, or other sensor that detects human actions. The gestures may touch, point to, or otherwise indicate specific portions of the image 300, in which case the system may identify specific objects 302 displayed in the image at the locations indicated by the gestures. For example, the gesture may be a finger touching a screen of the client system 130 at a location where an object in the image 300 is displayed. In this case, feedback may be provided on the device's screen, through the client device's audio output (e.g., speaker), or by any other type of output that can be generated by the device client device 130 (e.g., haptic feedback). This system may have particular applications in, for example, aiding the blind, teaching children, learning a foreign language, and other tasks that involve communication with humans.

Feedback may be produced in response to the gesture input. Audio identifying the classification of a mask may play as a user 101 touches a portion of an image 300 corresponding to one or more of the masks 502-520. For example, if an image 300 features a lighthouse on a coast, a mask may be generated over the lighthouse, the mask may be classified as a lighthouse, and a user 101 may touch the image in a location corresponding to the lighthouse. As the user 101 touches the lighthouse, the client device 130 may play audio indicating that the user 101 is touching the lighthouse. As another example, the gesture may be a swiping gesture. As the swiping gesture moves between portions of an image corresponding to different masks, audio may be played corresponding to the different masks. For example, if an image 300 includes a tea cup 318 on a saucer 316, a user 101 may swipe across the image 300, and audio identifying the saucer 316 and tea cup 318 may be played when the gesture reaches the corresponding masks 516, 518.

The feedback provided in response to a user gesture may be any type of suitable feedback. The feedback may be provided when for example, a user's gesture leaves or enters an area corresponding to a mask. Example types of feedback include audio, haptic, or visual. Audio feedback may include audio describing the object corresponding to an object. Haptic feedback may include vibrating the client system 130 when, e.g., a user's gesture leaves or enters an area corresponding to a mask. Visual feedback may include displaying a textual description of the object, e.g., "a tea cup" or "a tea cup on a table." There may also be feedback as a user's gesture transitions from a mask to a portion of an image without a mask or with an unidentified mask. For example, a sound may play or the device may vibrate when these transitions occur. In cases where feedback is haptic, vibrating speed or intensity may vary, e.g., as an indication that a user's gesture is approaching the edge of a mask.

Masks from related images may be overlaid on an image. For example, one image may depict a box having an open lid and contents, and masks may be generated for the contents of the box. A second image may depict the box with its lid closed. The masks for the contents of the box may be overlaid on the second image with the lid closed.

Figure 6:
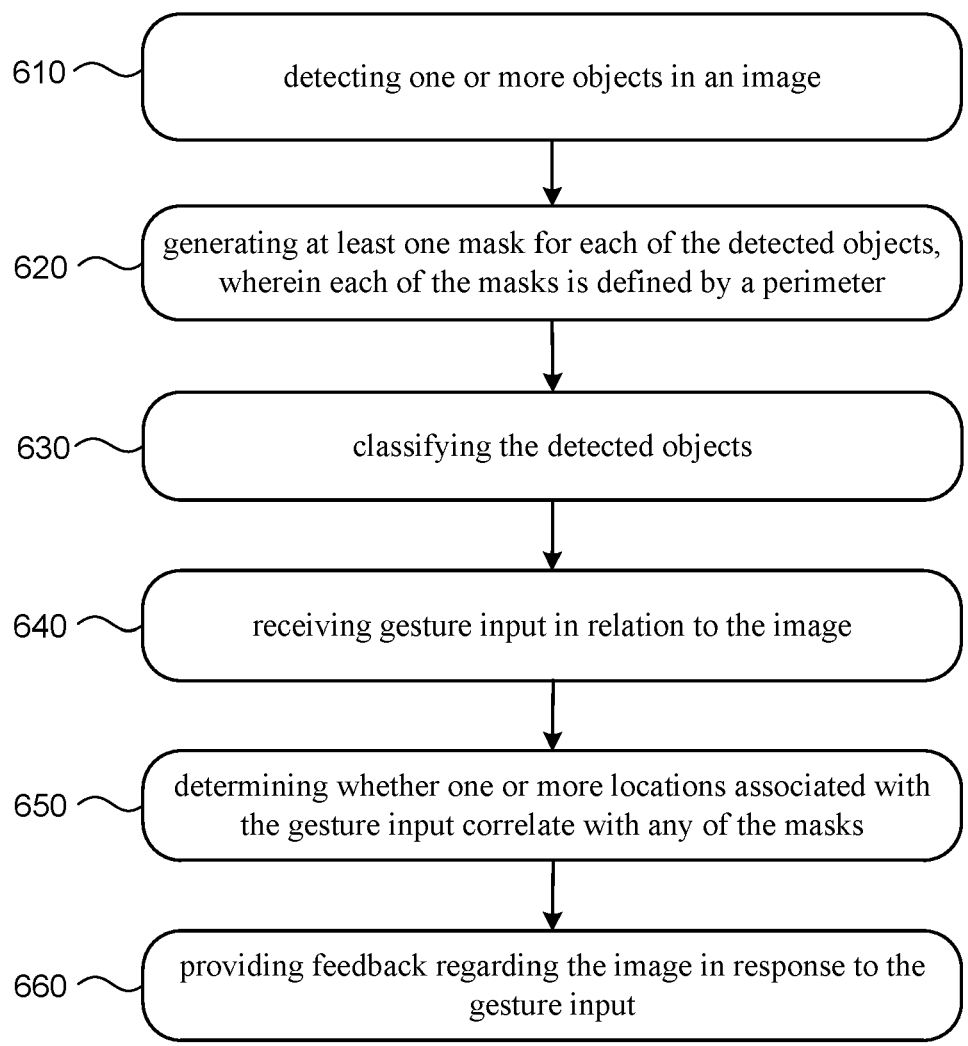
FIG. 6 illustrates an example method for generating interactive objects based on an image.

FIG. 6 illustrates an example method 600 for generating interactive objects based on an image. The method may begin at step 610 by detecting one or more objects in an image. Step 620 may generate at least one mask for each of the detected objects, wherein each of the masks is defined by a perimeter. Step 630 may classify the detected objects. Step 640 may receive gesture input in relation to the image. Step 650 may determine whether one or more locations associated with the gesture input correlate with any of the masks. Step 660 may provide feedback regarding the image in response to the gesture input.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating interactive objects based on an image including the particular steps of the method of FIG. 6, this disclosure contemplates any suitable method for generating interactive objects based on an image including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
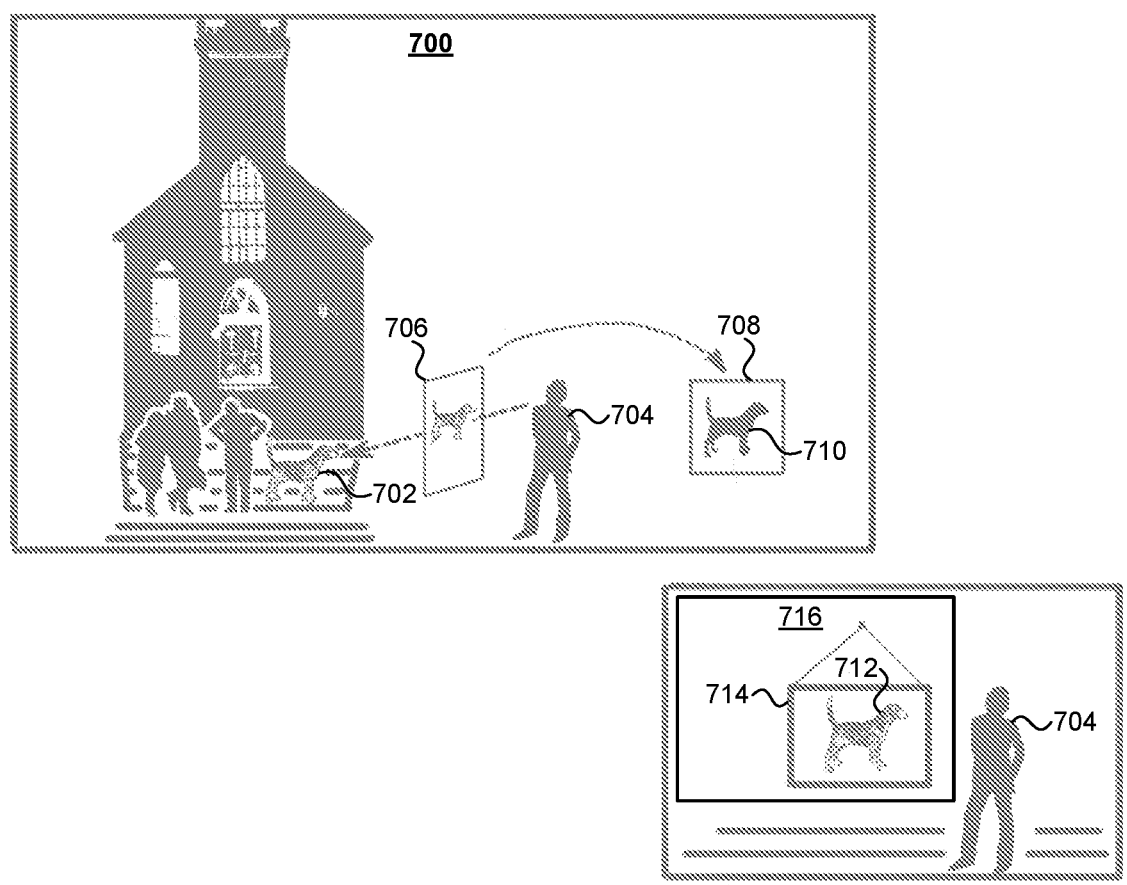
FIG. 7 illustrates an example of applying a mask generated from an image to a three-dimensional object in a virtual reality environment.

FIG. 7 illustrates an example of applying a mask 710 generated from an image or sub-object 706 to a three-dimensional object 714 in a virtual reality environment 700. In particular embodiments, a user 704 of a virtual reality environment 700 may request that an image or sub-object 706 be made of a portion of the user's view, such as the dog object 702, and a mask 710 be generated based on the image or sub-object 706. In particular embodiments, the image or sub-object 706 may be a two-dimensional (2D) image 706 or a three-dimensional (3D) sub-object 706. The user 704 may be a virtual representation of the user 101, and may be controlled by the user 101 via appropriate virtual reality hardware devices, and the objects in the line of sight of the virtual user 704 may be displayed to the user 101 using appropriate virtual reality hardware devices. The mask 710 may be generated using image segmentation techniques such as DeepMask and SharpMask, and classified using image classification techniques such as MuiltiPathNet. The user 704 may apply the mask 710 to a 3D object 714, e.g., a picture frame, in the virtual reality environment 700. When the mask 710 is applied to a 3D object 714, the object 702, which is depicted in the 2D image or represented by the 3D sub-object 706 that corresponds to the mask 710, is incorporated into the 3D object 714 as an incorporated image or sub-object 712 of the 3D object 714 to form a virtual object 716, e.g., a picture frame that incorporates the dog object 702. The incorporated image or sub-object 712 may then appear in association with, e.g., as if attached to or rendered onto a surface of, the 3D object 714 in the virtual reality environment 700, thus forming a new virtual object 716. For example, the incorporated image or sub-object 712 may be represented as a photograph attached to the 3D object 714, e.g., as if the photograph is attached to the 3D object 714 with glue, adhesive tape, a pushpin, or other form of attachment at a location on the 3D object 714 designated by the user 704. As another example, the incorporated image or sub-object 712 may be represented as if it is painted onto the 3D object 714 at a location designated by the user 704. That is, the mask 710 may be used like a sticker that depicts the incorporated image or sub-object 712, and can be affixed to the 3D object 714 while molding its shape to conform to the shape of the 3D object 714 as appropriate. Although particular ways of associating the incorporated image 712 with the 3D object 714 are described, these examples, and the incorporated image 712 may be associated with the 3D object 714 in any suitable way.

In particular embodiments, if the virtual reality environment 700 includes a touch-sensitive user interface that uses pressure sensors, then one or more attributes of the mask 710 may be presented in the user interface when the user 101 touches the mask 710 with at least a threshold pressure (e.g., a pressure that indicates the user is pressing the touch screen with a force greater than the average force applied in user interface interactions). Attributes of the mask 710 may include descriptions of the object 702 or of the image or sub-object 706 from which the mask 710 is generated. For example, if the object 702 is a dog, the attributes of the mask may include the text "dog." If the object 702 is a man wearing a hat, the attributes may include the text "man wearing a hat." If the object 702 is a black cat, the attributes may include the text "furry" and "black." The attributes may be presented in the user interface using an appropriate output device, such as a display screen that displays the attributes, or an audio output device that speaks the text of the attributes. Although the attributes are described as being presented when a user touches the input device with at least a threshold pressure, the attributes may be presented in response to any other appropriate input, e.g., when the user double-taps on the mask 710 or on the portion of the object 716 that incorporates the image or sub-object 712. As another example, the attributes may be presented in response to the user 704 moving a 3D object that includes the mask 710 or object 716 towards the eyes or face of the user, or making other gestures associated with inspecting the mask 710 or object 716 in the virtual environment 700.

In particular embodiments, a virtual reality environment 700 may include a user interface (UI) that a user 704 can interact with to delineate a region of the 3D environment, such as a two-dimensional region around the dog object 702, to be used to form a two-dimensional (2D) image 706. The 2D image 706 may be a picture of a particular virtual object 702. The particular virtual object 702 may be, e.g., a photograph, a display screen, or a shirt on an avatar of a user in the virtual reality environment 700. The 2D image 706 may be used to generate a mask 710. For example, the 2D image 706 may be a camera perspective view of an object 702 in the virtual reality environment 700. The camera perspective view may represent a view of the user 704, e.g., from the perspective of the user 704, in the virtual reality environment 700. The UI may provide a tracing mode or command in which the user 704 may delineate a portion of the virtual reality environment 700 by drawing a perimeter using movement of their finger, head, or eyes (e.g., to trace a perimeter starting from a point determined by a direction in which the user is initially looking). As another example, the user 704 may delineate a perimeter using a virtual tool such as a pointer-like object that can be used to draw the perimeter around a scene or object in the user's field of view. A two-dimensional image 706 may then be generated from the portion of the 3D environment within the perimeter from the user's point of view, such as the dog object 702. The size of the perimeter may be derived from the distance between the user's eyes and the pointing finger or tool. The delineated region may be converted to a 2D image 706 in a plane perpendicular to the user's line of sight, and the size of the 2D image 706 may correspond to the size of the perimeter around the region, such as the region that includes the dog object 702.

In particular embodiments, the user 704 may interact with the user interface to delineate or otherwise select a 3D sub-object 706 of the object 702. The 3D sub-object 706 may be, e.g., a 3D model of the delineated or selected region, such as the dog object 702 or a delineated portion of the dog object 702. As another example, the object 702 may represent an object from which portions may be detached or broken off to form a 3D sub-object 706. For example, the object 702 may be a plant having leaves or flowers that may be detached to form sub-objects 706, or a building having attached icicles that may be broken off to form sub-objects 706. The 3D model that represents the sub-object 706 may be extracted from a 3D model that represents the object 702, or may be generated based on the 3D shape of the object 702, for example.

As another example, a 2D or 3D region in an image or sub-object 706 (or other image, such as a virtual photograph) may be delineated by detecting one or more objects in the image 706 and determining a perimeter of at least one of the detected objects. The perimeter of at least one of the detected objects may be used as the perimeter of the delineated region of the 3D environment. If a plurality of objects is detected, then the delineated region may include the detected objects. For example, perimeter of the delineated region may correspond to a 2D or 3D bounding box that contains the plurality of objects.

In particular embodiments, the delineated 2D or 3D region may be a region in the user's field of view, e.g., to a region having a specified area or dimensions. The area or dimensions of the region may be calculated on a plane perpendicular to the user's field of view, such as the plane of the image 706. In one example, the region may be the user's entire field of view, so that every object visible to the user may be one of the detected objects. In another example, the region may be a reduced-size portion of the user's field of view, such as a region centered on the user's line of sight and having a specified area or dimensions, e.g., an area that is 30%, 50%, 75%, or other percentage of the area of the user's field of view. The area or dimensions may be specified by the user or determined automatically. For example, if the computing device performing image recognition is able to recognize and generate masks 710 for every object in the user's entire field of view in real-time, the region may be the user's entire field of view.

As another example, the UI may enable the user 704 to point at an object 702 and request that the object 702 and/or all nearby objects within a predetermined distance or radius of the object be delineated. A two-dimensional image 706 that includes the object(s) 702 may then be generated from the user's view of the object(s) 702 as described above. Alternatively, a 3D sub-object that includes the object(s) 702 may be generated from the user's view of the object(s) 702. Although particular examples of user interfaces for delineating a portion of the 3D environment are described, such delineation may be performed using any appropriate user interface. A user 704 may be able to select a particular mask 710 (from a set of masks) that corresponds to a particular object 702 in the image 706. For example, a user may be able to toggle between masks 710 or select a mask 710 with a gesture. A user may select multiple masks 710. For example, a user may gesture with a swipe motion and touch multiple masks 710.

Once one or more masks 710 are selected, the portion of the image 706 corresponding to the selected masks 710 may be used to generate a mask object 708. The mask object 708 may be a two-dimensional image in the virtual reality environment (e.g., a sticker), and may be rendered as a 2D object or a 3D object. Alternatively, the mask object 708 may be a 3D object in the virtual reality environment (e.g., a sticker that appears to be a 3D object, or a 3D sub-object delineated or otherwise generated from the object 702).

In particular embodiments, the mask object 708 that represents the mask 710 in the virtual reality environment 700 may be used by the user, e.g., as a 3D object (which may be flat or nearly flat, similar to a card, or may have 3D properties, similar to a piece of paper that does not remain flat, or, e.g., a flower detached from a plant, or an icicle broken off from a building) in the virtual reality environment, to create a new virtual object 716 based on a 3D object 714 by applying the mask 710 associated with the mask object 708 to the 3D object. For example, a user 704 may place the mask object 708 on or near the 3D object 714 in the virtual environment 700. The user 704 may perform an affixing motion similar to placing a sticker on an object, e.g., by holding the mask object 708 in a position adjacent to the 3D object 714, and/or pushing the mask object 708 in the direction of the 3D object 714. As another example, if the 3D object 714 is a pen, then the mask object 708 may be used to add a skin image based on the portion of the image 706 from which the mask 710 was created to a cylinder shape that matches the pen. A mask object 708 may also be manipulated in the virtual reality environment 700 (e.g., a user may extrude a 2D mask object 708 into a 3D object 714, transform the image 706 represented by the mask 710, and so on). As another example, images depicting sides of a box may be joined to create a 3D box in virtual reality. The mask objects 708 may be glued together, joined by a hinge, or joined in any other suitable combination.

In particular embodiments, a mask 710 may be applied to a 3D object 714 to generate a virtual object 716 that includes a combination of the mask 710 and the 3D object 714. The mask 710 may be applied to the 3D object 714 as a result of actions performed by the user 704 in the virtual reality environment 700. The user 704 may associate the mask 710 (or a corresponding mask object 708) with the 3D object 714 to cause the mask 710 to be applied to the 3D object 714, as described below. In particular embodiments, the mask 710 may be applied to the 3D object 714 by generating a surface mesh based on the mask 710 and incorporating the surface mesh onto or into the 3D object 714, e.g., by applying the mesh to the 3D object 714 so that the mesh conforms to the shape of the 3D object. The surface mesh may be based on the object 702 delineated in the image 706, such as the dog object 702. The surface mesh may be, for example, a polygon mesh. A polygon mesh may be a collection of vertices, edges, and faces that represents the shape of a 3D object. The faces may be triangles, quadrilaterals, or other polygons. A vertex may be a position in 3D space along with other information, such as color. An edge is a connection between two vertices. A face may be a set of edges, e.g., three edges for a triangle face, or four edges for a quad face. A simple representation of a polygon mesh may be a set of vertices and, for each vertex in the set, a list of other vertices to which the vertex is connected. The edge and face information is implicit in this representation. Other representations may include explicit edge or face information.

The mask object 710 may have properties in the virtual reality environment 700 based on object type(s) identified in the image 706. In the example above, if the mask object 708 is a pen, then the pen in the virtual reality environment 700 may have corresponding properties (e.g., the virtual pen may be able to write in the virtual reality environment). The properties of the mask object 708 or the 3D object 714 may be set manually, e.g. by a user manually labeling the mask object 708, mask 710, or 3D object 714 with a particular object type (or object name or other kind of label). For example, a mask object 708 that looks like a sword may be labeled with the object type "pen" to cause the mask object 708 to have the properties of a pen, such as being able to write). In one example, the properties of the mask object 708 may be applied to the 3D object 714. If a mask 710 or mask object 708 that looks like a sword and acts like a pen is applied to a 3D object 714, then the appearance of the sword, e.g., a 2D image 706 of a sword associated with the mask 710 or mask object 708 may be applied to the 3D object 714, and the pen property may also be applied to the 3D object 714, so that the 3D object 714 may have the properties of a pen, such as being able to write. As another example, a 3D object 714 that has the properties of a sword may be labeled "pen" (e.g., by a user) to cause the 3D object 714 to have the properties of a pen. In particular embodiments, the mask object 708 may include one or more objects of particular types, and images of the included objects may be associated with a 3D object 714. In particular embodiments, a 3D object 714 may have one or more slots that may accept objects, such as mask objects 708, of particular types. Each slot may be restricted to only accepting objects of the particular associated type. Alternatively, each slot may be configured to perform specified actions when a mask object 708 having a particular type is detected within a threshold distance of the 3D object 714. For example, if the user 714 carries the mask object 708 to a location near a 3D object 714 that accepts objects of the same type as the mask object 708, then the mask object 708 may automatically associate itself with the 3D object 714, or may prompt the user for permission to do so. As another example, if the user attempts to associate a mask object 708 with a 3D object 714 that does not accept the mask object's type, then the association is not established.

Figure 8:
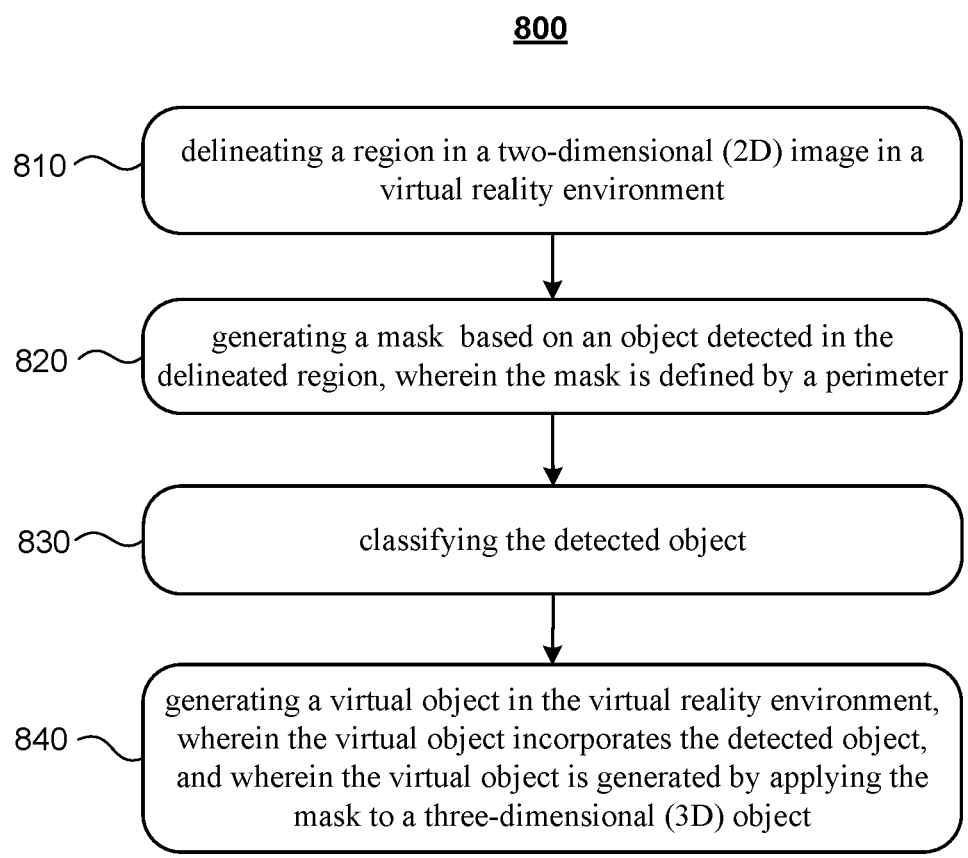
FIG. 8 illustrates an example method for generating a mask from an image and applying the mask object to a three-dimensional object in a virtual reality environment.

FIG. 8 illustrates an example method 800 for generating a mask from an image and applying the mask object to a three-dimensional object in a virtual reality environment. The method may begin at step 810 by delineating a region in a two-dimensional (2D) image in a virtual reality environment. Step 820 may generate a mask based on an object detected in the delineated region, wherein the mask is defined by a perimeter. Step 830 may classify the detected object. Step 840 may generate a virtual object in the virtual reality environment, wherein the virtual object incorporates the detected object, and wherein the virtual object is generated by applying the mask to a three-dimensional (3D) object.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for generating a mask from an image and applying the mask object to a three-dimensional object in a virtual reality environment including the particular steps of the method of FIG. 8, this disclosure contemplates any suitable method for generating a mask from an image and applying the mask object to a three-dimensional object in a virtual reality environment including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
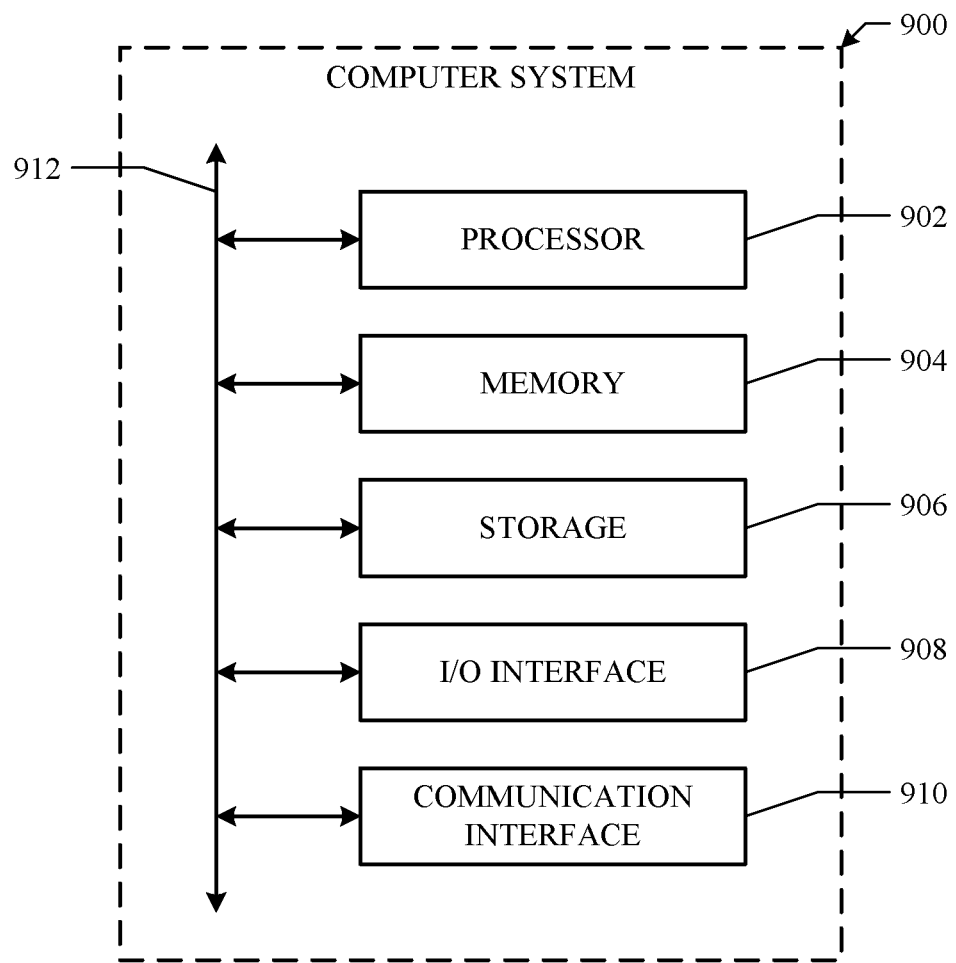
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device, detecting first and second objects in an image;
   by the computing device, generating a first mask for the first object and a second mask for the second object, wherein each mask is defined by a corresponding perimeter;
   by the computing device, classifying the first and second objects, wherein the classifying identifies a first classification based on the first object and a second classification based on the second object;
   by the computing device, receiving first gesture input in relation to the image;
   by the computing device, identifying a first location associated with the first gesture input, wherein the first location corresponds to the first mask for the first object;
   by the computing device, identifying a relationship between the first and second objects; and
   by the computing device, providing first feedback regarding the image, wherein the first feedback is in response to the first gesture input and comprises a description of the relationship between the first and second objects.

2. The method of claim 1, wherein the first location associated with the first gesture input is within the perimeter that corresponds to the first mask.

3. The method of claim 1, wherein the description comprises identifications of the first and second objects based on the respective first and second classifications.

4. The method of claim 3, wherein the identifications of the first and second objects comprise names of the first and second objects, and the names are based on the first and second classifications.

5. The method of claim 1, wherein the first and second classifications are identified using an image classification algorithm.

6. The method of claim 1, wherein the relationship between the first and second objects is identified using an image segmentation or classification algorithm.

7. The method of claim 6, further comprising:
by the computing device, determining a size ratio between the first and second objects, wherein the size ratio is based on the respective first and second classifications;
by the computing device, determining a relative position of the first object in relation to the second object, wherein the relative position is determined based on a comparison of the relative sizes of the first and second objects in the image to the size ratio,
wherein the relative position of the first object in relation to the second object indicates whether the first object is in front of or behind the second object, and
the description of the relationship between the first and second objects describes the relative position of the first object in relation to the second object.

8. The method of claim 6, wherein the first location associated with the first gesture input corresponds to a region in which first and second objects overlap,
wherein the detecting the first and second objects in the image is performed by the image segmentation algorithm, and the image segmentation algorithm further determines that the first object is in front of the second object, and
wherein the description of the relationship between the first and second objects identifies the first and second objects and indicates that the first object is in front of the second object.

9. The method of claim 8, further comprising:
by the computing device, receiving second gesture input in relation to the image, wherein the second gesture input is received subsequently to the first gesture input;
by the computing device, identifying a second location associated with the second gesture input, wherein the second location corresponds to the first mask for the first object; and
by the computing device, providing second feedback regarding the image, wherein the second feedback is in response to the second gesture input and identifies the second object.

10. The method of claim 9, wherein the first and second gesture inputs comprise subsequent taps in the region in which first and second objects overlap on a touch screen of the computing device.

11. The method of claim 6, wherein the second object is contained within the first object,
wherein the detecting the first and second objects in the image is performed by the image segmentation algorithm, and the image segmentation algorithm further generates a list of one or more objects nested within the first object, the list of objects including the second object, and
wherein the description indicates that the first object contains other objects.

12. The method of claim 11, wherein the description further comprises the names or types of the one or more objects nested within the first object.

13. The method of claim 11, wherein a size threshold is associated with one or more of the objects nested within the first object, and
wherein the description further includes one or more descriptions of one or more of the objects nested within the first object that are smaller than the size threshold.

14. The method of claim 6, wherein the first object is contained within the second object,
wherein the detecting the first and second objects in the image is performed by the image segmentation algorithm, and the image segmentation algorithm further generates a list of one or more objects nested within the second object, the list of objects including the first object, and
wherein the description indicates that the first object is contained in the second object.

15. The method of claim 1, wherein each of the masks comprises data identifying the corresponding detected object, and the perimeter that defines each mask corresponds to a perimeter of the detected object for which the mask is generated.

16. The method of claim 1, wherein the first feedback is played as speech by an audio output component of the computing device.

17. The method of claim 1, wherein the first feedback is displayed as text by a display component of the computing device.

18. The method of claim 1, wherein the first gesture input comprises a swipe gesture across a touch screen of the computing device or a tap gesture on the touch screen, at least a portion of the gesture input is detected at the first location, and at least a portion of the image is displayed on the touch screen at the first location.

19. One or more computer-readable non-transitory storage media embodying software that is operable when executed to:
detect first and second objects in an image;
generate a first mask for the first object and a second mask for the second object, wherein each mask is defined by a corresponding perimeter;
classify the first and second objects, wherein the classifying identifies a first classification based on the first object and a second classification based on the second object;
receive first gesture input in relation to the image;
identify a first location associated with the first gesture input, wherein the first location corresponds to the first mask for the first object;
identify a relationship between the first and second objects; and
provide first feedback regarding the image, wherein the first feedback is in response to the first gesture input and comprises a description of the relationship between the first and second objects.

20. A system comprising: one or more processors; and a memory coupled to the processors comprising instructions executable by the processors, the processors being operable when executing the instructions to:
detect first and second objects in an image;
generate a first mask for the first object and a second mask for the second object, wherein each mask is defined by a corresponding perimeter;

classify the first and second objects, wherein the classifying identifies a first classification based on the first object and a second classification based on the second object;

receive first gesture input in relation to the image;

identify a first location associated with the first gesture input, wherein the first location corresponds to the first mask for the first object;

identify a relationship between the first and second objects; and provide first feedback regarding the image, wherein the first feedback is in response to the first gesture input and comprises a description of the relationship between the first and second objects.

* * * * *